United States Patent
Kirkland et al.

(10) Patent No.: US 6,894,700 B2
(45) Date of Patent: May 17, 2005

(54) MULTISAMPLING DITHERING WITH SHUFFLE TABLES

(75) Inventors: Dale L. Kirkland, Madison, AL (US); James L. Deming, Madison, AL (US)

(73) Assignee: 3Dlabs, Inc., Ltd., Hamilton (BM)

( * ) Notice: Subject to any disclaimer, the term of this patent is extended or adjusted under 35 U.S.C. 154(b) by 0 days.

(21) Appl. No.: 10/786,430

(22) Filed: Feb. 25, 2004

(65) Prior Publication Data

US 2004/0164993 A1 Aug. 26, 2004

Related U.S. Application Data

(62) Division of application No. 10/230,500, filed on Aug. 29, 2002, now Pat. No. 6,765,588.
(60) Provisional application No. 60/346,550, filed on Jan. 8, 2002.

(51) Int. Cl.[7] .................................................. G09G 5/00
(52) U.S. Cl. ....................... 345/611; 345/563; 345/592; 345/626; 382/269; 382/283
(58) Field of Search ................................. 345/563, 592, 345/611, 626, 422, 768, FOR 103, 113; 382/212, 213, 269, 283

(56) References Cited

U.S. PATENT DOCUMENTS

| | | | |
|---|---|---|---|
| 5,317,680 A | | 5/1994 | Ditter, Jr. |
| 5,651,107 A | | 7/1997 | Frank et al. |
| 6,396,473 B1 | | 5/2002 | Callahan et al. |
| 6,429,877 B1 | * | 8/2002 | Stroyan ..................... 345/611 |
| 6,462,748 B1 | | 10/2002 | Fushiki et al. |
| 6,476,807 B1 | * | 11/2002 | Duluk et al. ................ 345/421 |

* cited by examiner

*Primary Examiner*—Matthew C. Bella
*Assistant Examiner*—G. F. Cunningham
(74) *Attorney, Agent, or Firm*—Carlton Fields, P.A.; Li K. Wang, Esq.

(57) ABSTRACT

A system and method for generating random coverage masks for rendering images with transparent objects. The system uses shuffle tables for addresses of a pixel to index into a transparency table and to obtain a transparency mask, which is then ANDed with a coverage mask to obtain a new coverage mask.

5 Claims, 2 Drawing Sheets

MULTISAMPLING DITHERING WITH SHUFFLE TABLES

CROSS-REFERENCE TO RELATED APPLICATION

This application is a divisional application and claims the benefit of U.S. patent application Ser. No. 10/230,500, filed on Aug. 29, 2002, now U.S. Pat. No. 6,765,588 which claims the benefit of U.S. Provisional Patent Application Ser. No. 60/346,550, titled MULTISAMPLE DITHERING WITH SHUFFLE TALBES, filed on Jan. 8, 2002, the entirety of which is hereby incorporated by reference.

BACKGROUND OF THE INVENTION

1. Field of the Invention

The present invention relates to computer graphics, and more specifically relates to pixel sample manipulation.

2. Description of the Related Art

In a computer graphics display application, an image is generated by a display system and displayed on a screen. The image is composed by an array of individual picture-cells ("pixels"). Pixels are the dots of color that define the image. Each of the pixels is defined by characteristics such as color and intensity. Traditionally, pixels are organized into a two-dimensional array or grid defined by raster lines. Each line is drawn by scan displaying the individual pixels along the line.

In practice, rather than defining the characteristics of each pixel, display systems define an image from a collection of primitive graphic shapes such as polygons. The polygons are numerically represented in terms of size, color, location and other characteristics, and the most common polygons used in rendering graphic images are triangles. To accomplish an image, the polygon representations are processed by an image generator producing pixel data signals through a process called polygon rendering. In effect, polygon rendering involves sampling a polygon to calculate how the polygon influences the pixels.

Display systems typically generate each pixel data signal by sampling several locations within the pixel of the polygon. This sampling technique is used to reduce undesirable visual artifacts in the displayed image. These visual artifacts, commonly referred to as aliasing, often appear as jagged lines at the polygon boundaries.

Some reduction of artifacts can be achieved with "polygon smoothing." Polygon smoothing is achieved by computing a coverage value for each pixel a polygon touches. The coverage value is proportional to the amount of the pixel covered by the polygon. The coverage value is used to modify alpha, which is used to blend to color of the polygon with contents of the frame buffer. In this technique, each fragment generated by rendering a triangle or other primitive is sampled at a higher rate. The total number of samples lit by the fragment modulates the intensity of the color for the fragment. However, this technique requires that the triangles in the scene be sorted by depth. The sorting is computational intensive.

The visual artifacts can also be reduced by a technique known as multisampling. Multisampling does not require sorting. Each pixel will have all its samples stored in the frame buffer. The standard Z buffering algorithm is applied to each sample.

Multisampling increases the sample rate for a given display resolution. The sample rate is arbitrary, but is usually 2, 4, 8 or 16 samples per pixel. The higher the sample rate, the less visual artifacts appear in the final image.

Cables are an example of objects that produce visual artifacts. If a cable is in the distance, then its width will be less than one pixel on the display. Without multisampling, the cable will appear as a dotted line, with each pixel that the cable passes through appearing as a dot. As the viewpoint of the cable changes, the dots will appear to move like raindrops.

With multisampling, the cable will light a small portion of every pixel it passes through. The intensity of each pixel will be proportional to the size of the cable. This reduces or eliminates the dotted line effect.

Multisampling is also useful to render transparent objects. Many scenes contain transparent objects such as windows. These objects affect the color of a pixel, but allow objects behind them to be visible. Opaque objects in front of a transparent object occlude the transparent object. If pixels are sampled at 16 samples per pixel, then a transparent object that transmits $15/16^{th}$ of all the light passing through it can be rendered by discarding 15 of the 16 samples taken while rendering it. In other words, a transparent object transmitting $15/16^{th}$ of all the light passing through it can be rendered by discarding 15 of the 16 samples. The transparent object is rendered by changing color for only one sample. However, picking the same sample in every pixel to keep may introduce visual artifacts that multisampling is supposed to remove.

Therefore, it is desirous to have a system and method for selecting samples of a pixel to prevent introduction of visual artifacts when multisampling is used to improve quality of rendered images. Accordingly, it is to the provision of such a system and method that the primary invention is primarily directed.

SUMMARY OF THE INVENTION

The present invention provides a system and method for drawing pictures involving transparent objects without need for time-consuming sorting of coverage triangles. The system and method represent an advantage because it eliminates computing intensive sorting.

Normally to draw a transparent object, one must draw objects behind the transparent object first, which means one must sort the triangles to determine what objects are behind the transparent object, then draw the transparent object and modify the color of the objects behind the transparent object. Modification of color is thus based on the transparency of the object. After drawing the transparent object, one then draws objects in front of the transparent object, and this means more sorting of the triangles to determine what objects are in front of the transparent object.

The system and method eliminate triangle sorting, which is computationally intensive. When drawing a transparent object, the system uses X and Y addresses of a pixel to index into a shuffle table, and then using the output of the shuffle table to retrieve a transparency mask from a transparency table. The transparency mask is then ANDed with a coverage mask to generate a new coverage mask. The new coverage mask is then used to determine which samples to be dropped and which samples to be painted with the color of the transparent object. Because of X and Y addresses changes for each pixel, the transparency mask retrieved changes for each pixel, and thus creates a random coverage mask.

The present invention therefore represents an advantage in selecting samples of a pixel by preventing the introduction of visual artifacts when multisampling is used to improve quality of rendered images. The invention prevents unwanted visual artifacts through using a random pattern of kept or discarded samples between adjacent pixels. The present invention also allows finer levels of transparency through providing discreet levels of transparency over a specific region.

Other objects, features, and advantages of the present invention will become apparent after review of the hereinafter set forth Brief Description of the Drawings, Detailed Description of the Invention, and the Claims.

DETAIL DESCRIPTION OF THE PRESENT INVENTION

In the following disclosure, Boolean terms are used to describe the logic functions, and thus, the terms "AND", "OR" and the like are to be interpreted as their intended logical functions. The present invention is a system and method particularly advantageous in rendering images having transparent objects without introducing visual artifacts. The system and method prevent, or at least greatly reduce, visual artifacts by randomly determining a pattern of samples to keep or to discard, and the more random the pattern, the less visual artifacts are likely to appear. It also allows finer levels of transparency. For example, a 8×8 pixel region yields 1024 samples when sampling at 16 samples per pixel, and by using a random pattern of samples to discard, the transparency can have 1024 discreet levels over the 8×8 pixel region.

In addition, the random pattern can also be defined to allow several transparent objects to be rendered easily. The random pattern can be divided in to layers. For example, if object 1 transmits 99% of the light passing through, and object 2 transmits 95% of the light. Then 10 of the 1024 samples can be assigned to object 1, and 50 of the 1024 samples can be assigned to object 2. The scene can be rendering using the standard Z buffering techniques, and still achieve a high degree of realism. Without this technique, the rendering would require more complicated algorithms to achieve the same effect.

Figure 1:
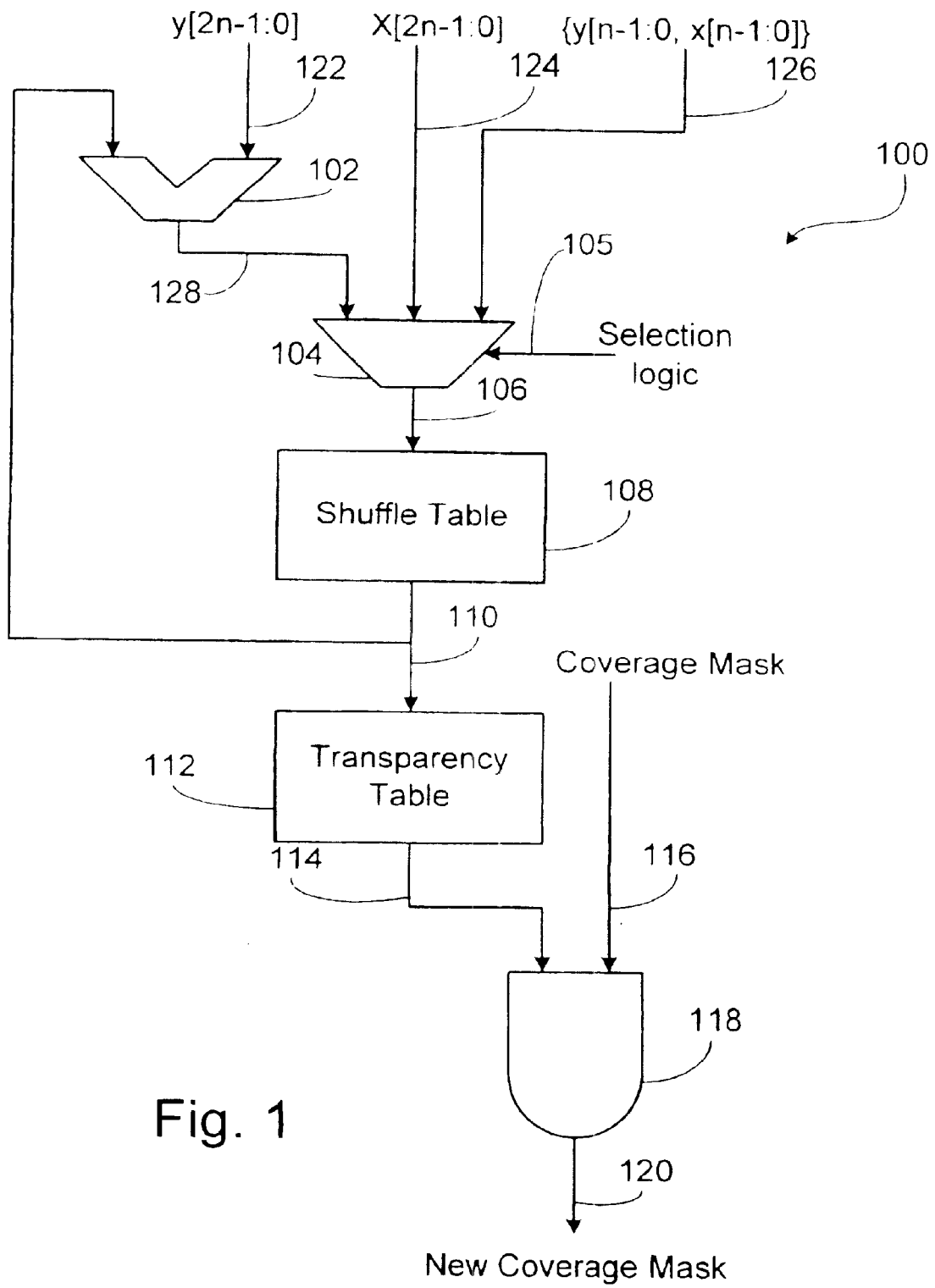
FIG. 1 is a block diagram illustrating the logic for generating a random sample coverage mask.

Now referring to the block diagram of FIG. 1, the logic 100 to generate a random sample coverage mask can be implemented in either hardware or software. The logic 100 uses a table of transparency patterns 112, which is indexed by a shuffle table 108. The shuffle table 108 adds more randomization in the mapping of screen coordinates, X and Y, to an index in the transparency table. X address 124 or Y addresses 122 of each pixel, or concatenation 126 of low bits of X and Y addresses are fed to a multiplexer 104, which selects an address for indexing the shuffle table 108. A selection logic 105 determines which source address to used as the index to the shuffle table 108. The selection logic 105 is controlled by a mode register (not shown). The mode register is programmed by the driver based on the system configuration. The Y address 122 is provided by lower 2 n bits of Y address of the pixel to be rendered; the X address 124 is provided by the lower 2 n bits of X address of the same pixel; the concatenation 126 results from concatenating lower n bits of Y address and lower n bit of X address. The resulting address 108 has 2 n bits and is used to look up the shuffle table 108. The output 110 from the shuffle table 108 is used to index the transparency table 112.

The transparency mask 114 from the transparency table 112 is ANDed with a coverage mask 116 to produce a new coverage mask 120. The coverage mask 116 is a string of 0s and 1s. For samples inside of a coverage triangle, a 1 is used to enable the mask; for samples outside of a coverage triangle, a 0 is used to disable the mask. This string of 0s and 1s is combined (ANDed) at the AND gate 118 with the output 114 from the transparency table 112 to produce another string of 0s and 1s. For a more transparent object, the new coverage mask 120 would have more 0s, which means more samples are disabled. A less transparent object would have more 1s.

In an alternate embodiment, another logic can be implemented to generate more random sample patterns. The logic use X address 124 to obtain a first index from the shuffle table 108, and the first index is added through the adder 102 to Y address 122, and then the output 128 from the adder 102 is used to derive an index to the transparency table 112. This logic ensures less repetition of sample patterns.

Figure 2:
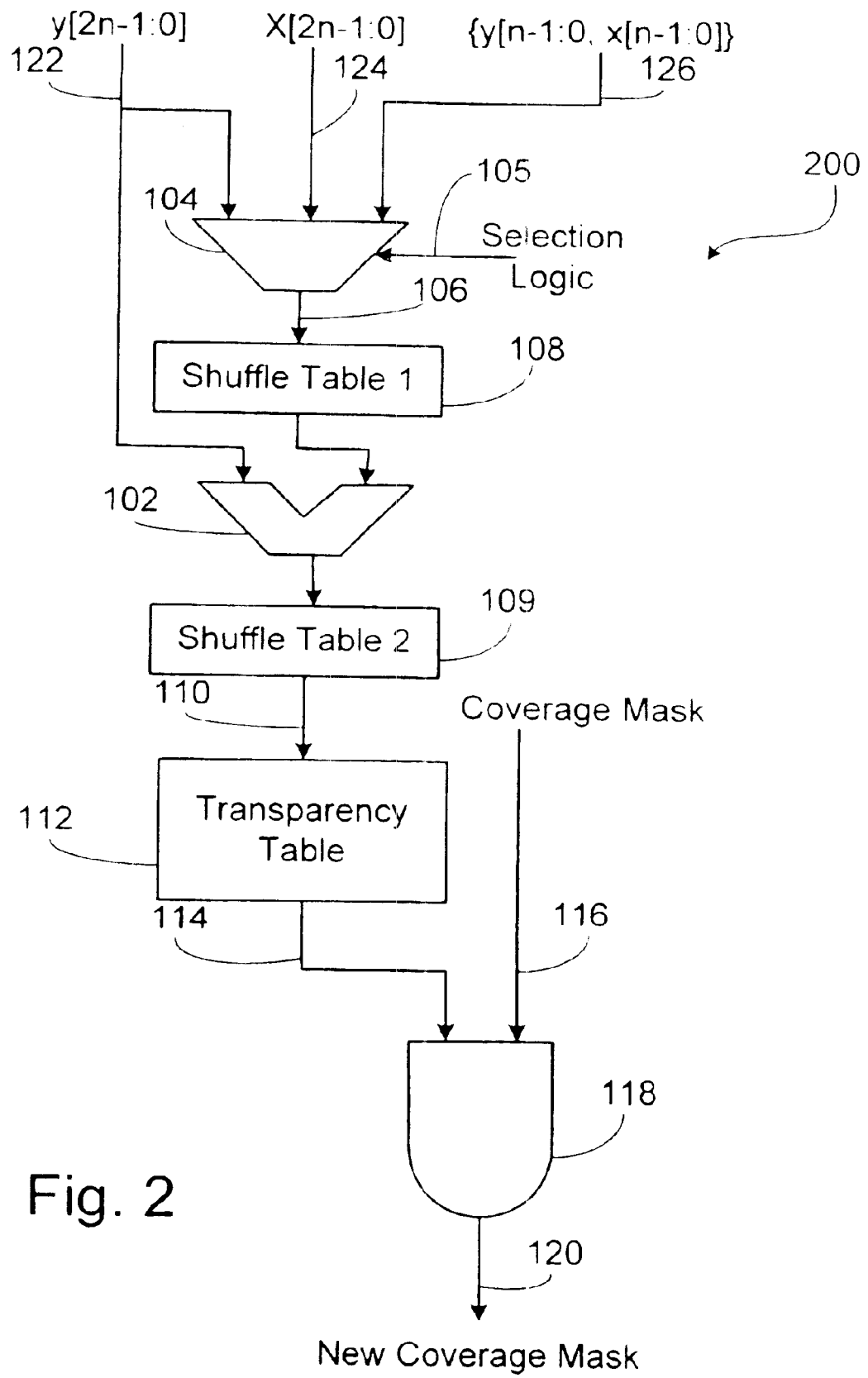
FIG. 2 is a block diagram illustrating an alternative embodiment of the system with two shuffle tables.

In yet another embodiment shown in FIG. 2, an additional shuffle table 109 may be added after the first shuffle table 108, and thus eliminating the need to pass through the first shuffle table twice.

For an exemplary embodiment, where n equals 3, the output 110 of the shuffle table 108 has 8 bits. The output of the transparency table depends on the number of samples. For 16 samples, the output 114 of the transparency table 112 has 16 bits.

While there has been shown a preferred and alternate embodiment of the present invention, it is to be understood that certain changes may be made in the forms and arrangement of the elements and steps of the method without departing from the underlying spirit and scope of the invention as is set forth in the claims. Furthermore, although elements of the invention may be described or claimed in the singular, the plural is contemplated unless limitation to the singular is explicitly stated.

What is claimed is:

1. A method for using random coverage masks for reducing visual artifacts while rendering transparent objects, said method comprising the steps of:

selecting a first index from a plurality of sources;

receiving a second index from a first shuffle table based on said first index;

obtaining a transparency mask from a transparency table based on said second index; and generating a new coverage mask by combining said transparent mask with a coverage mask.

2. The method of claim 1, further comprising the steps of:

concatenating lower bits of X address and Y address of a pixel; and selecting the concatenated lower bits for said first index.

3. A system for generating random coverage masks for use in rendering transparent objects, said system comprising:

first index selecting means for selecting a first index from a plurality of sources;

a shuffle table in communication with said first index selecting means, said shuffle table receiving said first index and outputting a second index;

a transparency table in communication with said shuffle table, said transparency table receiving said second index and generating a transparency mask; and means for combining said transparency mask with a coverage mask and producing a random coverage mask, wherein said random coverage mask randomly enables samples of transparent objects.

4. The system of claim 3, wherein said first index selecting means further comprises a multiplexer and a selection logic.

5. The system of claim 3 further comprising means for adding two sources, one source being in communication with said shuffle table.

* * * * *